May 21, 1968     H. G. SKINNER     3,383,944

UNIVERSAL VALVE HANDLE AND ADAPTOR

Filed Feb. 23, 1966

Inventor
Harvey Gee Skinner
his attorneys

United States Patent Office 3,383,944
Patented May 21, 1968

3,383,944
UNIVERSAL VALVE HANDLE AND ADAPTOR
Harvey Gee Skinner, Latrobe, Pa., assignor, by mesne assignments, to Vulcan Mold and Iron Company, Latrobe, Pa., a corporation of Pennsylvania
Filed Feb. 23, 1966, Ser. No. 529,361
5 Claims. (Cl. 74—543)

ABSTRACT OF THE DISCLOSURE

A universal valve stem adaptor is provided which can be secured to any form of valve stem to cooperate with a removable handle for operating such valve.

---

The present invention relates to valve handles and more particlularly to a handle and adaptor combination which can be employed with a wide range of sizes and types of valve stems or spindles.

The many varied types and sizes of valves available at the present time, for the most part, each require a specially constructed handle for operating the stem or spindle forming part of the valve mechanism. The handle end of the valve stem or spindle is fabricated with a wide range of configurations. For example, the handle end may be round, square, hexagonal or other keyed configuration; it may be milled, threaded or plain; and any of these configurations may be tapered in varying degrees to increase the frictional engagement with an operating handle when secured thereto. In view of the many differing forms of handles that are required, it is difficult, if not impossible, in most cases to procure a replacement handle for a given valve, in the event of loss or breakage of the valve handle. In many cases, then, the loss or breakage of the valve handle, which is a fairly common occurrence, necessitates replacement of the entire valve. Such replacement, of course, entails a disproportionate time and expense in view of the comparatively small cost of a replacement valve handle, if such be available.

In many applications, as where a number of valves, or the handles therefor, are accessible to the public or otherwise to unauthorized personnel, it would be desirable to remove the valve handles or operators with a view to minimize or prevent altogether the chances of tampering by such personnel. At the present time, however, it is impractical to do so because of the large number of differing handles which may be involved and the difficulties of sorting and returning the handles to the proper valves when authorized operation is again required. Such operation could be made feasible, however, by the provision of a universally applicable valve handle.

The foregoing difficulties are solved by the present invention with the provision of a universal valve stem or spindle adaptor which can be secured to any of the aforementioned valve mechanisms within its size limitations. The adaptor itself can be left permanently in place upon the valve stem or spindle or it can be readily removed from those valves which are not operated frequently. The handle of the invention can then be maintained separately of the valves to prevent its loss or breakage and to prevent unauthorized manipulation of the valves since, without the valve handle the valve stem with the adaptor thereon cannot be manipulated without suitable tools, which unauthorized personnel are not likely to have in their possession. With this arrangement, then, a large number of valves with differing stem or spindle configurations can be equipped with the aforementioned adaptors of the invention for operation by the same handle or handles of the invention.

The foregoing desirable results are accomplished by the provision in accordance with the invention of a valve spindle adaptor having an outer or peripheral keyed configuration which is shaped for seating in a complementarily shaped recess of a valve handle for manipulating the adaptor and the valve spindle to which the latter is secured. The adaptor is further provided with adjustable clamping means whereby the adaptor can be releasably secured to a wide variety of valve spindle keyed configurations of differing sizes, which are normally provided for securance to the handles usually supplied with such valves. The aforementioned outer periphery of the valve spindle adaptor is sufficiently small as to render manipulation of the valve spindle with the adaptor thereon by hand, without the use of the aforementioned handle or with other tools, exceedingly difficult if not altogether impossible. Moreover, the angular or keyed configuration of the adaptor, with the presence of several relatively sharp corners, which would be present in most of the contemplated forms of the invention, further discourages unauthorized attempts to manipulate the valve mechanism with only the adaptor secured thereto by hand.

These and other objects, features and advantages of the invention will be elaborated upon during the forthcoming description of presently preferred embodiments of the invention together with presently preferred methods of practicing the same.

In the accompanying drawings, I have shown certain presently preferred embodiments of the invention and have illustrated certain presently preferred methods of practicing the same, wherein.

Figure 6:
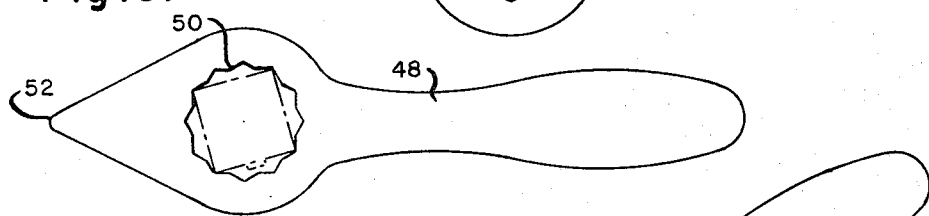
Figure 7:
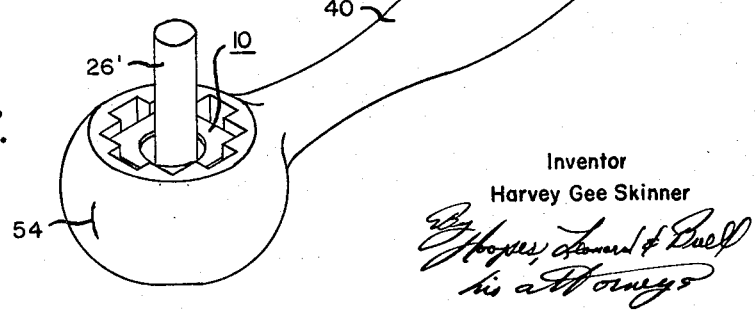

FIGURE 6 is a bottom plan view of still another form of the handle of the invention incorporating position indicating means and utilizing a conventional 12-point wrench socket to provide the aforementioned set screw clearance and to increase the number of angular positions at which the handle can engage the adaptor; and FIGURE 7 is an isometric view of an engaged handle and valve spindle adaptor, with portions thereof being broken away in order to show the invention more clearly.

Figure 1:
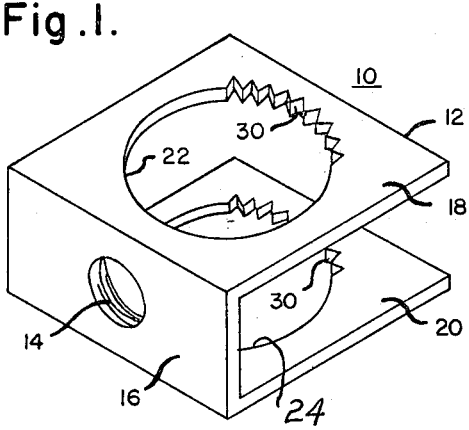
FIGURE 1 is an isometric view of one form of valve spindle adaptor arranged in accordance with the invention.
Figure 2:
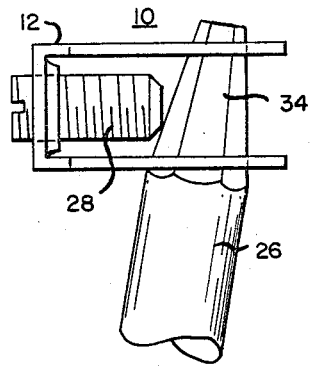
FIGURE 2 is a side elevational view of the valve adaptor shown in FIGURE 1 and illustrated here in operating position upon an exemplary valve spindle.
Figure 3:
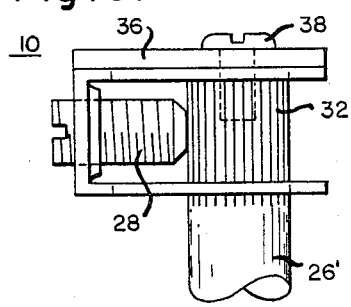
FIGURE 3 is a side elevational view of the spindle adaptor shown in the preceding figures and illustrating an alternative means of securing the adaptor to a valve spindle.

Referring now to FIGURES 1–3 of the drawings, the universal valve spindle adaptor 10 is provided in this arrangement generally in the form of a U-shaped bracket 12 having tapped set screw receiving opening 14 in bight portion 16 of the bracket. The upper and lower leg portions 18 and 20 respectively of the bracket 12 are provided with aligned spindle receiving apertures 22 and 24 respectively. In this example, the leg portions 18 and 20 are of square configuration, although it will be appreciated that other keying configurations can be utilized.

As better shown in FIGURE 2 or 3, when a valve spindle or stem 26 is inserted through the valve stem apertures 22 and 24 it is clamped therein by engagement with a properly positioned set screw 28. Retainment of the valve stem 26 in the apertures 22 and 24 is ensured by providing those edges of each aperture 22 or 24, which are disposed diametrically opposite from the set screw 28, with a serrated configuration 30. By means of the forces induced by tightening the set screw 28 against the end portion of the spindle 26, the engagement of the serrated edges 30 of the upper and lower apertures 22, 24 with the adjacent surfaces of the valve stem 26 produces a frictional contact or clamping of the valve spindle 26 between the set screw 28 and the serrated edges 30, regardless of a given spindle end configuration. For example, this clamping action is effective irrespective of whether the spindle end portion 26 is milled as shown in FIGURE 3 and designated by reference character 32 or is of a tapered hex or other wrench configuration as shown in FIGURE 2 and designated by reference character 34. It will be further apparent that the adaptor 10 will be securely clamped to a valve spindle similar to that shown at 26 in FIGURES 2 and 3, even in those cases where the end of the valve spindle is cylindrical, i.e., not provided with a keyed or tapered configuration or where the keyed configuration has been worn away or otherwise removed through use or abuse.

As better shown in FIGURE 2, where the valve spindle 26 is provided with a tapered keyed configuration, the valve spindle adaptor 10 still is effectively secured thereto although it is canted or inclined to the longitudinal axis of the spindle 26. However, such angular disposition of the adaptor 10 to the valve spindle does not in any way interfere with its engagement and manipulation by the universal valve handle of the invention which will be described presently.

Referring now more particularly to FIGURE 3, the possibilities of removal of the spindle adaptor 10 from the spindle 26 or 26', as by tampering or the like, can be further minimized by the provision of an apertured plate 36 overlying the adaptor 10 and having a generally similar outer contour, or alternatively, a size and shape larger than the spindle receiving apertures 22 and 24 but smaller than the outer, keyed periphery of the adaptor 10. The plate 36 is secured to the end of the spindle 26 or 26' by means of mounting screw 38 inserted through the aperture of the retaining plate 36 and threadedly secured to a tapped aperture disposed centrally and axially in the outer end of the spindle. If desired, the screw 38 can be provided with a one-way screwdriver slot (not shown).

The adaptor 10 can be provided with a variety of outer or peripheral keyed configurations with the square configuration shown in FIGURES 1-3 being merely illustrative rather than limitative thereof. The overall size of the adaptor 10, which may be of the order of a half inch to an inch on a side for most applications, is, therefore, sufficiently small to discourage unauthorized attempts to manipulate with the hand the valve spindle in the absence of suitable tools or of the universal valve handle of the invention.

Figure 4:
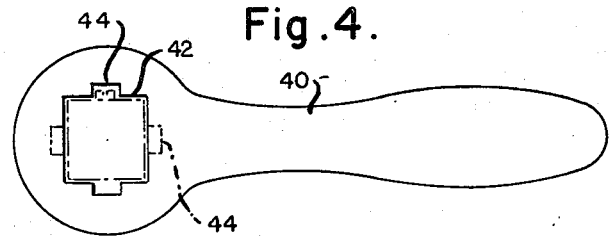
FIGURE 4 is a bottom plan view of a handle shaped for use with the universal valve spindle adaptor of the preceding figures.

The valve stem 26 or 26' of FIGURES 2 and 3, with the adaptor 10 thereon, can be manipulated by a handle having a complementarily shaped recess or socket for receiving the adaptor 10. As indicated above, both the keyed shape of the adaptor 10 and the keyed socket of the handle can be varied as desired. For purposes of illustration, then, a handle 40 as shown in FIGURE 4 having a square adaptor receiving socket or recess 42 can be employed for purposes of manipulating the valve stem and adaptor. The adaptor 10 is relatively closely fitted within the valve handle recess 42, as better shown in FIGURE 7, and it is therefore contemplated that a longer or shorter set screw 28 will be utilized depending upon the diametric thickness of the valve spindle 26 or 26'. Alternatively, the sides of the adaptor receiving recess 42 of the handle 40 can be vertically and centrally slotted respectively as denoted by dashed outlines thereof 44 (FIGURE 4), in order to receive the otherwise protruding outer end of the set screw 28.

Figure 5:
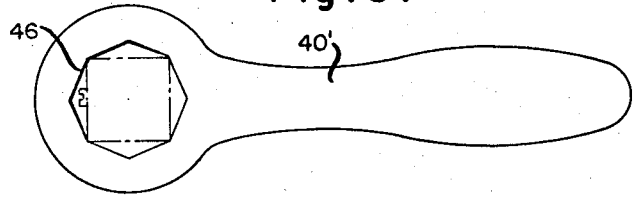
FIGURE 5 is a bottom plan view of another handle arranged in accordance with the invention, similar to that shown in FIGURE 4, but arranged to facilitate engagement with the aforesaid adaptor and to provide additional clearance for the set screw or other clamping means associated with the adaptor.

On the other hand, as shown in FIGURE 5 of the drawings, the valve handle 40' can be provided with an octagonally shaped adaptor receiving recess 46 which not only accommodates the aforementioned set screw when protruding substantially from the adaptor 10, but also increases the angular or positional variation within which the handle 40' can be engaged with the adaptor 10. Such positional variation is increased further with the use of valve handle 48 as illlustrated in FIGURE 6 of the drawings. The handle 48 is provided with a conventional 12-point wrench socket 50 to increase still further the aforementioned positional variation of the handle relative to the adaptor 10 and still provide for set screw clearance.

In those applications wherein the valve mechanism is provided with dial means, the adaptor 10 of the invention can be permanently secured to the valve spindle with its set screw 28 denoting, for example, the zero position of the valve spindle relative to the dial means, and the index thus provided by the adaptor can be preserved throughout movement of the adaptor and valve spindle by aligning a pointer 52 of the valve handle 48 (FIGURE 6) or other index mark 54 (FIGURE 7) of any of the aforementioned handles, with the aforementioned set screw 28 when the handle is placed on the valve stem adaptor 10.

From the foregoing it will be apparent that novel and efficient valve spindle adaptor and handle means therefor have been disclosed herein. While I have shown and described certain presently preferred embodiments of the invention and have illustrated presently preferred methods of practicing the same, it is to be distinctly understood that the invention is not limited thereto but may be otherwise variously embodied and practiced within the scope of the following claims.

I claim:

1. Universal valve handle means comprising an adaptor arranged for removable securance to a given valve spindle, said adaptor having a keyed outer periphery and spindle receiving recess means disposed generally centrally therein and clamping means mounted on said adaptor adjacent said recess means adapted to engage said spindle, and a valve handle member having a complementarily shaped recess therein removably receiving said adaptor to actuate said adaptor and the valve spindle secured thereto.

2. The combination according to claim 1 wherein said handle and said adaptor are each provided with index means alignable each with the other.

3. The combination according to claim 1 wherein said adaptor is a generally U-shaped bracket and said recess means are a pair of aligned spindle receiving apertures formed respectively in the leg portions of said bracket.

4. The combination according to claim 3 wherein said adaptor receiving recess of the handle is of sufficient depth to receive both leg portions of said U-shaped bracket, the outer peripheries of said leg portions respectively conforming to said adaptor periphery.

5. Universal valve handle means comprising a generally U-shaped adaptor bracket for removable securance to a given valve spindle, said adaptor having a keyed outer periphery and a spindle receiving recess means disposed generally centrally therein, said recess means being a pair of aligned spindle receiving apertures formed in the leg portions of said U-shaped bracket and clamping means mounted on said adaptor adjacent said recess means adapted to engage said spindle, said clamping means including a set screw threaded through a tapped aperture of the bight portion of said bracket, a valve handle member having a complementarily shaped socket therein removably receiving said adaptor to actuate said adaptor and a valve spindle secured thereto, said handle member having a recess associated with said handle socket for receiving an outwardly protruding portion of said set screw when said adaptor is inserted into said socket.

(References on following page)

References Cited

UNITED STATES PATENTS

| | | | |
|---|---|---|---|
| 9,939 | 8/1853 | McKinley | 74—543 X |
| 584,391 | 6/1897 | Moser | 287—52.08 X |
| 1,100,286 | 6/1914 | Cornelius | 287—53 X |
| 1,145,587 | 7/1915 | Hitchcock | 287—53 |
| 1,473,579 | 11/1923 | Hart | 287—53 X |
| 1,707,353 | 4/1929 | Fraser | 287—53 X |
| 2,913,265 | 11/1959 | Lang | 74—548 |

FRED C. MATTERN, JR., *Primary Examiner.*

J. S. CORNETTE, F. D. SHOEMAKER,
*Assistant Examiners.*